United States Patent [19]

Altendorfer et al.

[11] 4,094,418
[45] June 13, 1978

[54] APPARATUS FOR SIMULTANEOUSLY PIVOTING, TILTING AND ROTATING A LINING BRICK

[75] Inventors: Alois Altendorfer, Linz; Anton Stahrlinger, Stadl Paura, both of Austria

[73] Assignee: Vereinigte Osterreichische Eisen- und Stahlwerke-Alpine Montan Aktiengesellschaft, Vienna, Austria

[21] Appl. No.: 732,144

[22] Filed: Oct. 13, 1976

[30] Foreign Application Priority Data

Oct. 20, 1975 Austria .................................. 7947/75

[51] Int. Cl.² ............................................. B65G 47/90
[52] U.S. Cl. ............................... 214/1 BC; 214/1 BD; 214/1 Q; 214/6.5
[58] Field of Search .................. 214/1 R, 1 BC, 1 BH, 214/1 BD, 1 BV, 1 B, 1 BS, 6.5, 1 QD, 1 QF, 1 Q; 198/379; 74/63, 30, 70-83

[56] References Cited

U.S. PATENT DOCUMENTS

| | | | |
|---|---|---|---|
| 1,535,031 | 4/1925 | Nevins | 214/6.5 |
| 3,921,822 | 11/1975 | Dixon | 214/1 Q X |
| 3,970,137 | 7/1976 | Grolla | 214/1 QD X |
| 3,975,817 | 8/1976 | Frazier | 214/1 QF X |
| 3,999,664 | 12/1976 | Frazier | 214/1 QF X |
| 4,023,639 | 5/1977 | Perhed | 214/1 QF X |

FOREIGN PATENT DOCUMENTS

1,243,572 6/1967 Germany .............................. 214/6.5

*Primary Examiner*—Frank E. Werner
*Attorney, Agent, or Firm*—Burns, Doane, Swecker & Mathis

[57] ABSTRACT

An apparatus for simultaneously pivoting, tilting and rotating a lining brick, in particular a converter lining brick having a trapezoidal cross-section, into a position adequate for stacking has a stationary supporting stand, a carrying arm journaled on the supporting stand to be pivotable around a stationary axis, a bracing means for the lining brick journaled on one end of the carrying arm and rotatable around an axis that is skew relative to the stationary axis of the carrying arm, and a planet gear which can be turned off, whose central axis is the stationary axis of the carrying arm, and whose orbit axis is the axis of rotation of the bracing means.

6 Claims, 5 Drawing Figures

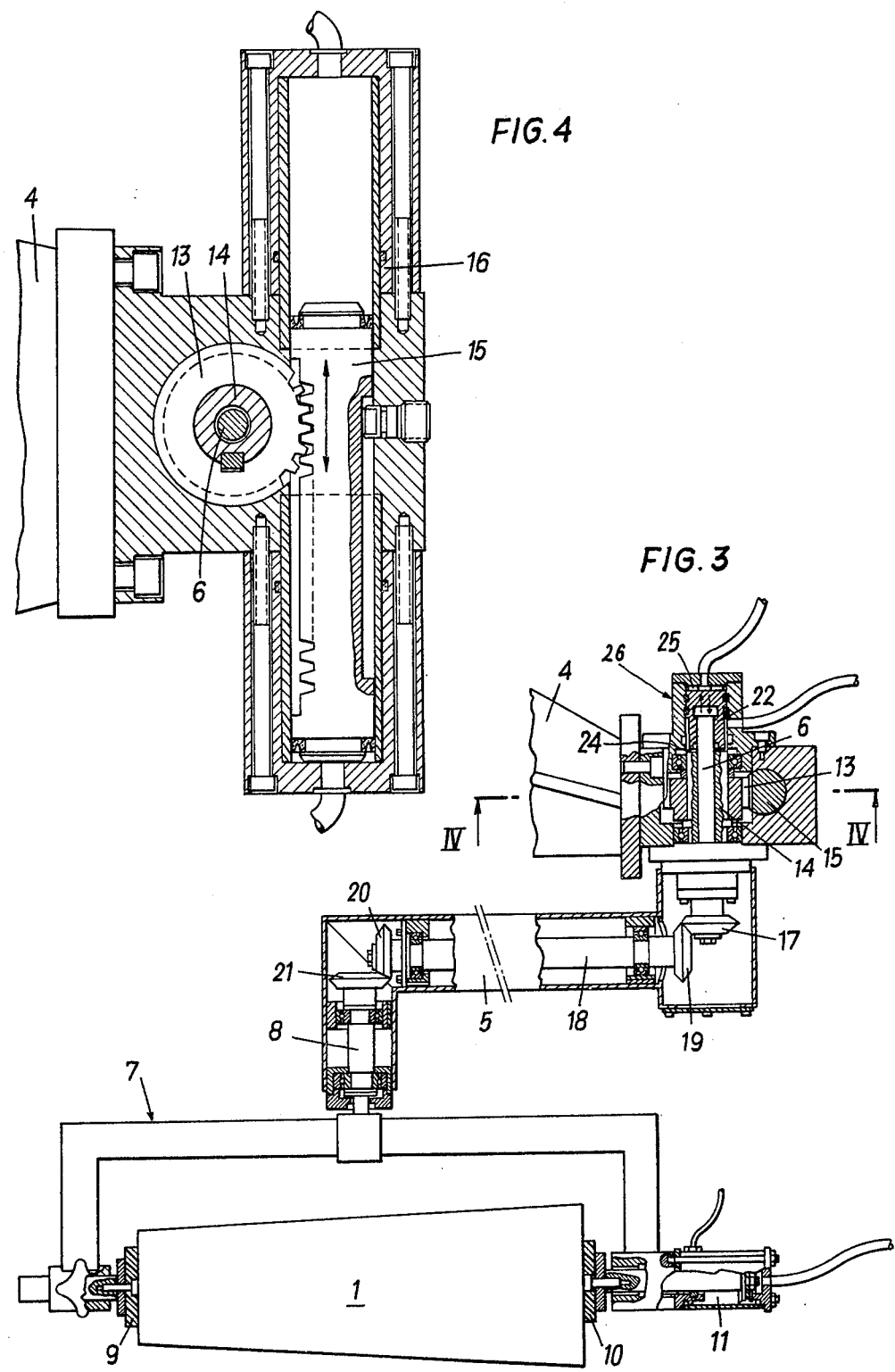

APPARATUS FOR SIMULTANEOUSLY PIVOTING, TILTING AND ROTATING A LINING BRICK

The invention relates to an apparatus for simultaneously pivoting, tilting and rotating a lining brick, in particular a converter lining brick having a trapezoidal cross-section, into a position adequate for stacking.

For lining a converter or a cylindrical metallurgical vessel, lining bricks having a trapezoidal cross-section are used. Such bricks are formed of refractory material, such as e.g. tar-bonded dolomite, in presses. In order to be able to stack the lining bricks as space-savingly as possible and by making the best use of the space available, every other brick, after leaving the press, must be laid down rotated by 180° relative to the preceding brick, i.e. in a manner that the bricks come to lie with their inclined side faces adjacent each other, while the wider end face follows upon the narrower end face of the neighbouring brick. Since due to the production technique employed, the bricks are pressed in a manner that the faces inclined towards each other lie perpendicularly above each other, the bricks — all of them — also have to be tilted, so that the bricks come to lie on one of their parallel sides.

Apparatusses are known, in which every other brick is pressed rotated by 180° relative to the preceding one, i.e. wherein the pressing mould carries out the rotation by 180°. These bricks are pushed out of the press and tilted by means of a tilting apparatus.

In another known apparatus, separate stations are provided, one for turning, one for tilting, and one for conveying out of the press. However, all these apparatusses have the disadvantage that they are complicated and expensive due to the plurality of mechanical installations needed and that the bricks are damaged quite easily due to the various subsequent procedures.

The invention aims at preventing these disadvantages and difficulties and has as its object to create an apparatus which enables pivoting a brick into a position adequate for stacking, tilting it and rotating it, while gripping it only once. It is a special object of the invention to simultaneously carry out these movements of the brick which results in an especially short cycle, during which the bricks are gripped by the apparatus. The apparatus is also to be easy to operate, i.e. to consist of as few movable parts as possible.

These objects of the invention are achieved in that a carrying arm is journaled on a stationary supporting stand to be pivotable around a stationary axis, a bracing means for the lining brick being rotatably journaled on the end of the carrying arm with an axis that is skew relative to the stationary axis of the carrying arm, wherein for rotation of the bracing means a planet gear capable of being turned off is provided, whose central axis is the stationary axis of the carrying arm and whose orbit axis is the axis of rotation of the bracing means.

If the lining brick is to be tilted by 90°, it is suitable for the stationary axis of the carrying arm to be inclined by 45° relative to the horizontal and for the axis of rotation of the bracing means to be inclined by 135° relative to the stationary axis of the carrying arm.

Advantageously, the ratio of transmission of the planet gear is 1 : 1.

According to a preferred embodiment, a pinion is provided for pivoting the carrying arm, which pinion engages with a toothed rack that can be actuated by pressure medium cylinder means and is concentrically arranged relative to the stationary pivot axis.

Therein it is suitable to provide a bevel wheel secured to the axis of rotation of the bracing means as planet wheel of the planet gear, which bevel wheel is drivable by the central wheel — also designed as bevel wheel — of the planet gear via a transmission shaft having corresponding bevel wheels at its ends, and that the central wheel with its shaft, on the one hand, is connectable with the pinion by a claw coupling, and, on the other hand, is fixable on the stationary supporting stand.

For a careful gripping and releasing of a lining brick, the bracing means is provided with two opposing plates, one of the plates being movable by means of a pressure medium cylinder in the direction towards the opposing plate.

The invention shall now be described by way of example only and with reference to the accompanying drawings, wherein:

FIG. 3 shows a section through the axes of the carrying arm and the bracing means, FIG. 4 is a section along line IV — IV of FIG. 3.

Figure 1:
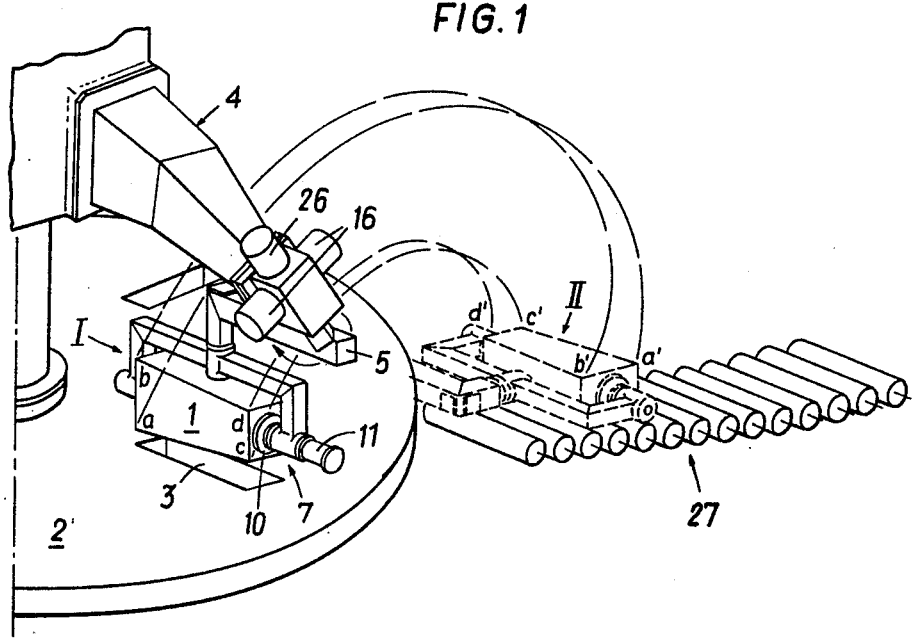
FIGS. 1 and 2 are oblique views of the apparatus according to the invention.

With 1 a lining brick with trapezoidal cross-section is denoted which is pushed out of the press 2 through the opening 3. Its faces inclined towards each other are above each other, its faces extending parallel to each other are perpendicular. A supporting stand 4 is rigidly mounted on the press, a carrying arm 5 being journaled at the end of the supporting stand to be pivotable around a stationary axis that is inclined by 45° relative to the horizontal. At the end of the carrying arm 5 a bracing means 7 for the lining brick is rotatably mounted, the rotation of the bracing means occuring around an axis being inclined to the stationary axis of the carrying arm 5 by 135°. Two opposing plates 9 and 10 are provided at the ends of the bracing means 7 for gripping the lining brick, the plate 10 of which being adjustable in direction to the plate 9 via a pressure medium cylinder 11.

The carrying arm 5 via a hollow shaft 14 is rigidly connected with a pinion 13 rotatably journaled on the supporting stand 4. For a rotation of the pinion and a pivoting of the carrying arm going hand in hand therewith the pinion 13 engages with a toothed rack 15 displaceably arranged in a cylinder 16. The toothed rack 15 is designed as flying piston and can be moved to and fro by selective actuation of one of the cylinder ends with a pressure medium in the direction of the arrows of FIG. 4, whereby the carrying arm can be pivoted in both directions of rotation.

The shaft 8 of the bracing means projecting into the carrying arm 5 carries a bevel wheel 21 which is drivable by the bevel wheel 17 arranged on the shaft 6 via a transmission shaft 18 having corresponding bevel wheels 19 and 20 at its ends. The bevel wheel 17, with its shaft 6, is connectable by a claw coupling 22 on the one hand with the hollow shaft 14 via the claws 24 and, on the other hand, with the supporting stand 4 via the claws 25, the claw coupling 22 being capable of actuation in the direction of the arrows of FIG. 3 by means of a pressure medium, and arranged on the shaft 6 with a feather key 23 to be secured against rotation, but displaceable. The claw coupling 22 is also displaceably arranged as a flying piston in a cylinder 26 and can be brought into the desired position by a corresponding actuation of the cylinder.

Figure 2:
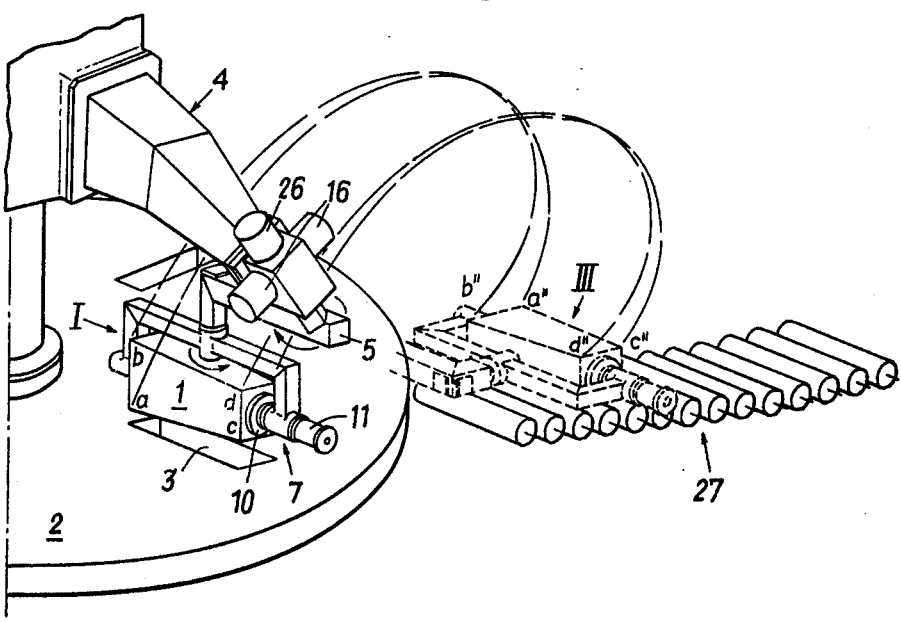

The apparatus according to the invention is arranged in a manner above the press 2 — as can be seen in FIGS. 1 and 2 — that the carrying arm places the bracing means in pivoted position, denoted with position I, precisely above the opening 3 of the press and in a position II or III, respectively, pivoted by 180°, above the roller table 27.

In FIG. 1 the pivoting and tilting is illustrated, and in FIG. 2 the pivoting, tilting and rotating of the lining brick is shown. In both of the cases illustrated, the carrying arm 5 is pivoted by means of the pressure medium cylinder 16 when the lining brick has been braced in the bracing means. According to FIG. 1, the bevel wheel 17 is connected with the pinion 13 via the claw coupling 22, whereby the bracing means 7 is fixed relative to the carrying arm.

The corners denoted by a, b, c and d of the lining brick in position I are denoted with a', b', c', and d' in position II.

Figure 5:
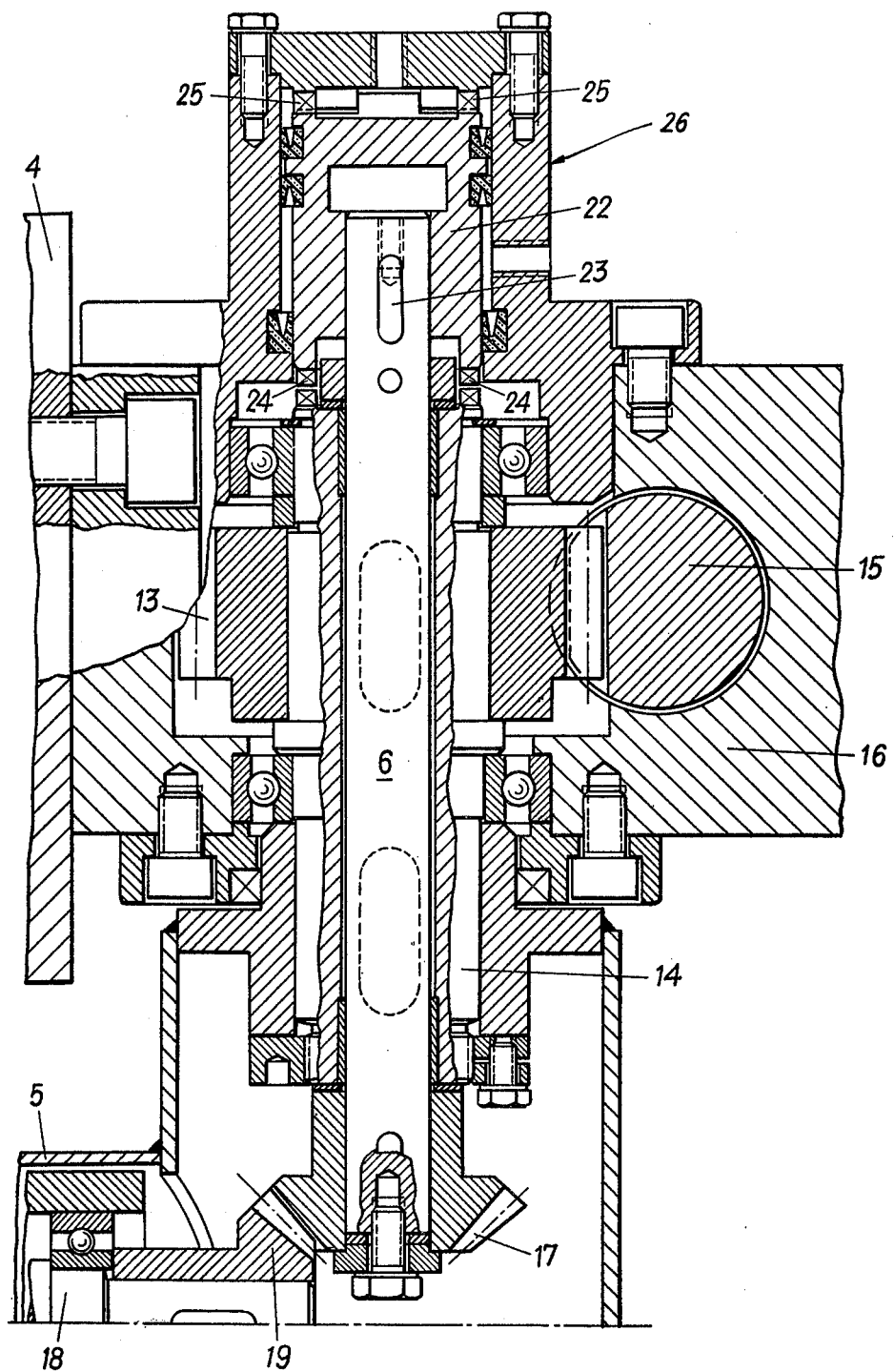
FIG. 5 shows a detail of the carrying arm drive on an enlarged scale in the same manner as FIG. 3.

In order to obtain a rotation by 180° simultaneously with the pivoting of the lining brick — as shown in FIG. 2 — the bevel wheel 17 — as shown in FIG. 5 — is fixed to a supporting stand 14 by the claw coupling, whereby a pivoting of the carrying arm 5 necessarily causes a turning of the bracing means relative to the carrying arm 5. This rotated position is entered in FIG. 2 as position III. For a better illustration of the movement of the lining brick, the corners of the lining brick denoted with a, b, c, and d in position I are denoted with a'', b'', c'' and d'' in position III.

The tilting of the lining brick takes place automatically by the axes of the carrying arm 5 and the bracing means 7 which are inclined towards each other and arranged at a distance from each other.

Thus one can obtain by a corresponding shifting of the claw coupling that every second lining brick is deposited on the roller path 27 rotated by 180°, i.e. oppositely to the preceding lining brick.

What we claim is:

1. An apparatus for simultaneously pivoting, tilting and rotating a lining brick, in particular a converter lining brick having a trapezoidal cross-section, into a position adequate for stacking comprising
    a stationary supporting stand,
    a carrying arm journaled on the stationary supporting stand to be pivotable around a stationary axis,
    a bracing means for holding the lining brick journaled on one end of the carrying arm to be rotatable around an axis that is skew relative to the stationary axis of the carrying arm, and
    a planet gear capable of being disengaged provided to rotate the bracing means and having a central axis coinciding with the stationary axis of the carrying arm and an orbit axis coinciding with the axis of rotation of the bracing means whereby as the carrying arm and bracing means are each caused to turn about their respective axis by a drive means, the lining brick may be selectively turned end for end in the process of being transferred from one location to another location.

2. An apparatus as set forth in claim 1, wherein the stationary axis of the carrying arm is inclined by 45° relative to the horizontal and the axis of rotation of the bracing means is inclined by 135° relative to the stationary axis of the carrying arm.

3. An apparatus as set forth in claim 1, wherein the planet gear has a transmission ratio of 1 : 1.

4. An apparatus as set forth in claim 1, said drive means comprising for pivotal movement of the carrying arm
    a pinion,
    a toothed rack engaging with the pinion, and
    pressure medium cylinder means for actuating the toothed rack,
    the pinion being concentrically arranged relative to the stationary axis of the carrying arm.

5. An apparatus as set forth in claim 4, further comprising
    a planet wheel provided for the planet gear, designed as bevel wheel and secured to the axis of rotation of the bracing means,
    a central wheel provided for the planet gear and designed as bevel wheel,
    a transmission shaft provided with corresponding bevel wheels at its ends, the planet wheel being drivable by the central wheel via the transmission shaft,
    a shaft provided for the central wheel, and
    a claw coupling for selectively connecting the pinion with the central wheel and its shaft and fixing the central wheel and its shaft on the stationary supporting stand.

6. An apparatus as set forth in claim 1, wherein the bracing means for holding the lining brick is provided with a first plate and a second plate arranged opposite the first plate, a pressure medium cylinder being provided for moving said first plate towards said second plate.

* * * * *